United States Patent [19]
Henning et al.

[11] Patent Number: 5,237,749
[45] Date of Patent: Aug. 24, 1993

[54] HAND TOOL FOR PEELING ELONGATED VEGETABLES

[75] Inventors: Wilhelm Henning, Hattingen; Hans G. Koenig, Werdohl, both of Fed. Rep. of Germany

[73] Assignee: Westmark Schulte * Co. KG, Fed. Rep. of Germany

[21] Appl. No.: 680,424

[22] Filed: Apr. 4, 1991

[30] Foreign Application Priority Data

Apr. 13, 1990 [DE] Fed. Rep. of Germany ....... 4012055
Mar. 1, 1991 [EP] European Pat. Off. ........ 91103060.9

[51] Int. Cl.$^5$ ...................... B26B 11/00; B26B 1/00; B25B 7/12
[52] U.S. Cl. ..................................... 30/123.6; 30/124; 81/302
[58] Field of Search ..................... 30/121.5, 122, 123.5, 30/123.6, 346, 353, 356, 124; 81/300, 302

[56] References Cited

U.S. PATENT DOCUMENTS

| | | | |
|---|---|---|---|
| 557,188 | 3/1896 | Capewell | 30/123.6 |
| 1,022,242 | 4/1912 | Jackson | 30/123.5 |
| 1,326,373 | 12/1919 | Rice | 30/123.6 |
| 1,628,087 | 5/1927 | Warren | 30/123.5 |
| 2,887,110 | 5/1959 | Roeschmann | 81/300 |
| 2,997,326 | 8/1961 | Daum | 81/311 |
| 3,160,185 | 12/1964 | Retherford | 30/123.6 |
| 3,376,639 | 4/1968 | Pompini | 30/124 |
| 3,420,563 | 1/1969 | Witt . | |
| 4,831,905 | 5/1989 | Murchison | 81/302 |

FOREIGN PATENT DOCUMENTS

| | | | |
|---|---|---|---|
| 20378 | 11/1904 | Fed. Rep. of Germany | 30/123.6 |
| 339504 | 11/1919 | Fed. Rep. of Germany . | |
| 1139945 | 11/1962 | Fed. Rep. of Germany . | |
| 1177086 | 8/1964 | Fed. Rep. of Germany . | |
| 346390 | 1/1905 | France . | |
| 2273500 | 2/1976 | France . | |

*Primary Examiner*—Frank T. Yost
*Assistant Examiner*—Paul M. Heyrana, Sr.
*Attorney, Agent, or Firm*—Antonelli, Terry, Stout & Kraus

[57] ABSTRACT

A hand tool for peeling elongated vegetables such as, for example, asparagus, carrots, cucumbers, black salsify, etc. including two hand levers pivotable against a spring force about a pivot axis, with the hand levers carrying, on free ends thereof, two mutually opposed paring knives constructed as low-waste peelers. The paring knives are oriented such that longitudinal center axes thereof are disposed parallel to the pivot axis of the hand levers and remain constantly aligned in parallel with each other independently of the pivoting position of the hand levers. The hand levers may be integrally formed in one piece from, for example, spring steel and the pivot axis and the longitudinal axis of the paring knives may be arranged inclined with respect to a longitudinal extension of the hand tool.

6 Claims, 7 Drawing Sheets

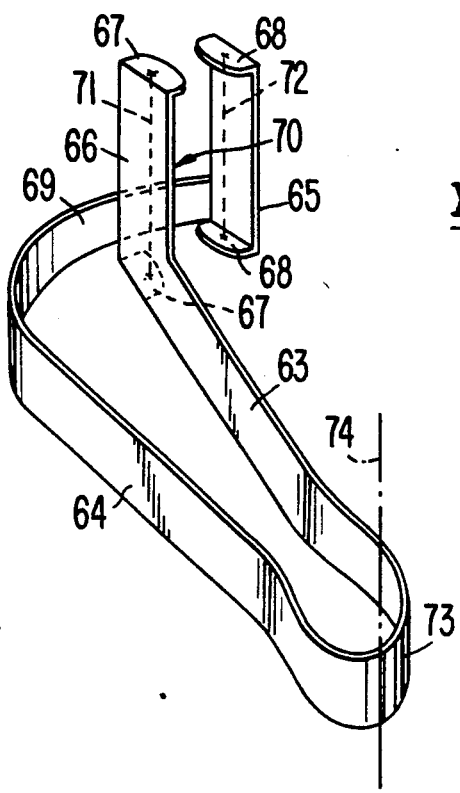
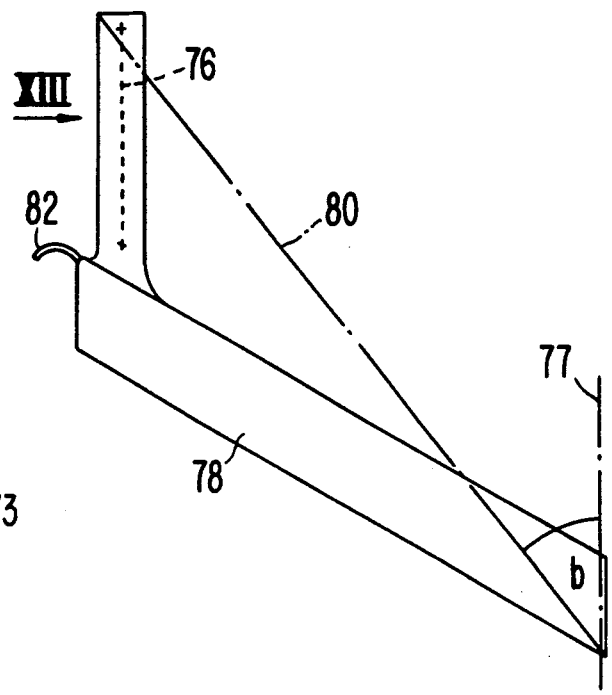
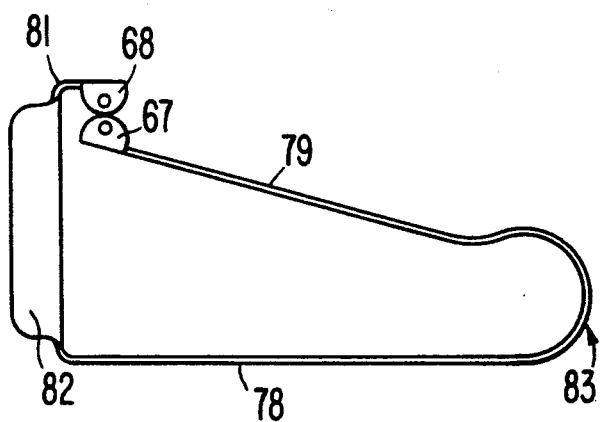
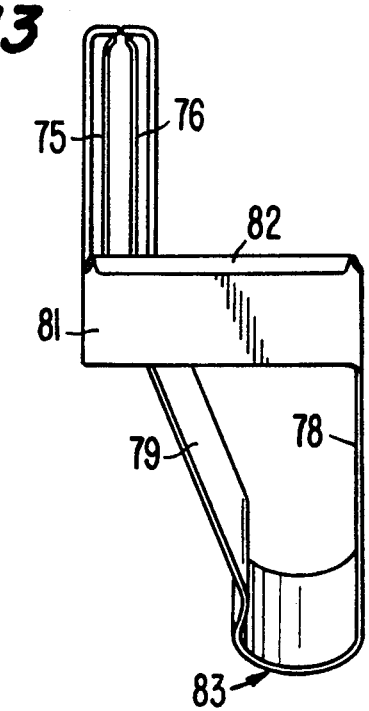

HAND TOOL FOR PEELING ELONGATED VEGETABLES

FIELD OF THE INVENTION

The present invention relates to a hand tool and, more particularly, to a hand tool for peeling elongated vegetables such as, for example, asparagus, carrots, cucumbers, radishes, black salsify, zucchinis, or the like, with the tool including two hand levers pivotable against a spring force about a pivot axis, and with the hand levers carrying, on free ends thereof, two mutually opposed paring knives fashioned as low-waste peelers.

BACKGROUND OF THE INVENTION

A hand tool of the aforementioned type is proposed in, for example, DAS 1,139,945 wherein the hand levers, urged or spread apart into a V-shape by a spring force, are provided, at free ends thereof, with two paring knives extending in a longitudinal direction of the hand levers and being mutually inclined with respect to the longitudinal direction in correspondence with the V-shape of the two hand levers. In use, during a paring, two strips of peel are simultaneously removed from an elongated or rod-shaped vegetable; however, the removed strips of peel are not in mutual diametrically opposition.

A disadvantage of the proposed hand tool resides in the fact that, when performing successive paring strokes, the user can only ascertain for certain that only the skin is removed by the paring knife within visible range during the carrying out of successful peeling strokes since the opposite paring knife is hidden by the vegetable. Consequently, it may occur that a strip of material is likewise peeled off the vegetable; however, by virtue of the fact that the second paring knife is hidden, there is no optical control possibility to readily ascertain whether the hidden paring knife peels off the skin or actual flesh of the vegetable. Thus, the use of this proposed hand tool often results in a considerable loss of actual vegetable tissue which is extremely disadvantageous particularly in the case of expensive vegetables such as, for example, asparagus.

In, for example, German Utility Model 7,816,311, a table top device is provided for peeling asparagus wherein pairs of diametrically opposed paring knives are carried by spring-loaded pivot levers, with an individual pivot axis of the pivot levers being oriented, in each case, in parallel to a longitudinal direction of the paring knives so that it is ensure that, independently of the pivoting position of the pivot levers, in all cases only exactly diametrically opposed strips of skin are removed.

A disadvantage of the last mentioned device resides in the fact that the peeling device includes many components and, consequently, is somewhat expensive. Moreover, the presence of the various components makes cleaning of the table type device not only extremely difficult but also time consuming and, as a practical matter, the proposed table top device is of little value as a household kitchen appliance.

In, for example, German Utility Model 7,525,168, another peeling device is proposed for peeling asparagus wherein the paring knives disposed in opposed pairs, must be pulled into an open position by way of pulleys in order to be able to introduce an asparagus shoot.

This last mentioned peeler has similar drawbacks as encountered in connection with the table top device of the aforementioned German Utility Model 7,816,311 since the device is expensive to manufacture and, as a practical matter, does not meet hygienic requirements imposed upon kitchen appliances.

Other prior art approaches are also proposed in, for example, German Patents 1,144,659 and 1,177,086.

While both of the last mentioned devices are relatively simple in construction, the peeling ability and manipulatability of the devices render the same relatively inefficient in addition to potentially resulting in a considerable loss of the actual vegetable tissue of the vegetable being peeled.

SUMMARY OF THE INVENTION

The aim underlying the present invention essentially resides in providing an economical and conveniently operable hand peeling tool by which it is possible to peel, with little waste, rod or elongated shaped vegetables that differ greatly in diameter, with the hand tool being cleanable without any effort and storable in a compact fashion.

In accordance with advantageous features of the present invention, a hand tool is provided which includes a pair of hand levers pivoted at one end, with paring knives being provided at respective opposite ends of the hand levers, and with the paring knives being oriented such that the longitudinal axes thereof are disposed in parallel to the pivot axis of the hand levers. The paring knives are arranged so as to be constantly aligned in parallel with each other and pivotable independently of the positioning of the hand levers.

By virtue of the above noted features of the present invention, it is possible to realize a hand tool which includes only a few relatively cleanable components, namely, only two hand levers joined by a hinge or pivot or by way of a resilient bow and a pair of paring knives attached to the respective hand levers so as to project therefrom.

By virtue of the parallel orientation of the respective paring knives with respect to the pivot axis of the hand levers, the paring knives are independent of the expanded position of the hand levers and, in each case, engage only at two diametrically opposite sides of the elongated or rod-shaped vegetable. Thus, with the hand tool of the present invention it is ensured that in the performance of successive peeling strokes, when the paring knife lying within the field of view is placed on a part of the rod-shaped or elongated vegetable still covered with skin, the other or hidden paring knife is automatically also aligned to a region of the elongated or rod-shaped vegetable that is still covered with skin so that no vegetable meat or tissue is unintentionally removed by the hidden paring knife. Consequently, the hand tool of the present invention ensures a low-waste peeling operation.

Furthermore, by virtue of the parallel orientation of the paring knives in accordance with the present invention, a guidance of the elongated or rod-shaped vegetable by a hand of the user is substantially simplified since no transverse forces are exerted on the vegetable that could lead to the vegetable slipping off the paring knives.

Advantageously, in accordance with the features of the present invention, with longitudinal dimensions of up to, for example, 20 cm, the hand tool of the present invention can be constructed so that even relative thick elongated or rod-like vegetables such as radishes, snake cucumbers, zucchinis, and even black salsify can be pared thereby enabling the hand tool of the present invention to be utilized with great versatility.

Furthermore, the present invention enables the realization of a compact construction so as to fulfill one of the most significant conditions with regard to kitchen appliances, namely, that such appliances, when not in use, can be accommodated in a compact fashion in a kitchen drawer or the like.

In accordance with the present invention, each hand lever has at a free end thereof, that is, the end opposite the pivot axis, a paring knife holder which projects at a right angle to a longitudinal extension of the hand levers. In this case though, the transverse dimension of the hand tool, perpendicularly to the pivoting plane of the hand levers, is at least as large as the length of the paring knives employed. For thin elongated or rod-shaped vegetables such as asparagus, relatively short paring knives can be used so that this transverse dimension of the device is still relatively small. However, the situation becomes more critical if the hand tool is constructed for cutting radishes and zucchinis since then correspondingly long paring knives must be utilized.

In order to reduce the structural size, preferably, in accordance with further features of the present invention, the pivot axis and the paring knives are arranged at an inclination with respect to the longitudinal extension of the hand tool. Such an arrangement is particularly handy and, preferably, an angle of inclination of the pivot axis with respect to the longitudinal extension of the hand tool, for example, the hand levers including the paring knife holders, is preferably in a range of about 15° to 40°.

By virtue of the last mentioned features of the present invention a slim non-bulky structural shape of the hand tool is obtained since the transverse dimension, hereinafter referred to as the height, is then considerably less than the length of the paring knife.

Advantageously, according to the present invention, the provision can be made that the height of the hand tool amounts to between one-fifth and one-eighth of the hand tool.

In accordance with still further features of the present invention, the hand levers may be articulated to each other by way of, for example, a hinge means and be stressed by an expansion spring arranged at the axis of the hinge means, with the hand levers being lockable in a closed position by a hinge lock means.

By virtue of the last mentioned features of the present invention, it is possible to realize a very space-saving storage of the hand tool.

It is also possible in accordance with the present invention to be manufactured integrally in one piece from a part which is resilient in a region or area of the pivot axis. For this purpose, preferably, the two hand levers, together with the holders, are bent from the one-piece punched part of, for example, spring steel.

By virtue of the manufacturing of the hand tool by a single resilient part and of spring steel, the hand tool can be manufactured very economically and may be maintained in a clean condition in a particularly effortless manner.

In accordance with the present invention, the hand levers may be articulated together as one-armed hand levers or can be articulated to each other in a manner similar to intersecting levers of conventional pliers. With a plier-type articulation, an especially advantageous force transmission relationship can be achieved; however, such achievement has the drawback of requiring a larger structural total length of the hand tool.

While the hand levers may be spread apart into a basic position by a spring, with the cutting contact pressure of the paring knives being determined by the hand of the user since a skilled user will not encounter any difficulties in precisely regulating the cutting pressure, difficulties may arise especially in the case of elongated or rod-shaped vegetables having locally harder skin zones. This difficulty is due to the fact that the increased tensile force exerted by one hand of the user in order to overcome such locally harder skin zones is triggered by an involuntary reflex toward an increased use of force by the hand which compresses the two paring knives and determines the cutting pressure. Such involuntary reflex may, for example, lead to a breakage of the vegetable if, for example, the vegetable is an asparagus spear.

In order to accommodate such potential involuntary reflex, in accordance with still further features of the present invention, it is possible to apply a cutting pressure, rather than by hand, automatically by a spring force and thus in a constant fashion. More particularly, this can be attained by articulating the hand levers in a central zone in a manner similar to, for example, legs of a clothespin, and making the paring knives spreadable apart by compression of the force legs of the hand levers against the spring force. Thus, the hand holding the hand tool merely brings about an opening movement of the hand levers in order to enable an introduction of the oblong or rod-shaped vegetable and, thereafter, the hand tool is then only held by the hand of the user for absorbing the tensile and compressive forces exerted during peeling by the other hand.

With a so-called clothespin-like construction, it is possible to fashion one force leg of the hand levers as a tool-holding handle and the force leg of the other hand lever as a thumb-depressible operating leg which is thus operated with the thumb of the user for merely opening the peeling slot formed by the two paring knives.

In order to realize economical construction of a hand tool with an automatic cutting contact pressure, in accordance with still further features of the present invention, one of the hand levers may encompass the other hand lever, and both paring knives may be located beside an outside of the outer hand lever and be spreadable by compressing the hand levers. The two hand levers may, in this instance, be integrally manufactured of a strip of spring steel so that the hand tool is also optimum with regard to maintaining the same clean and is fundamentally of a very compact design since the two hand levers are closed in the basic position.

With the hand levers being articulated to each other in a central zone thereof in the manner of clothespin legs, in accordance with further features of the present invention, the hand levers may each be fashioned as a substantially rectangular U-shaped bracket, with the brackets being articulated to each other, in each case, at two side legs, with at least one of the side legs being angled toward an outside in the region of the pivot axis, with the paring knives being supported at both ends on free ends of the side legs. According to the present invention, one of the hand levers may encompass the other hand lever with a projection, and both paring knives may be arranged beside the outside of the other hand lever and be spread apart by compressing the hand levers, with a support for the vegetable to be peeled being arranged at the projection.

Preferably, a height of the hand tool, when deposited on a resting surface, is less than a length of the paring knives and, the hand levers together with the paring knife holders may be of a flat substantially Z-shape.

It is also possible in accordance with the present invention for the hand levers to be provided with dished handles in a central zone thereof.

The above and other objects, features and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 10 is a perspective view of yet another embodiment of the present invention wherein a cutting contact pressure is provided by a spring force;

FIG. 11 is a partial lateral view of yet another embodiment of the present invention;

FIG. 12 is a top view of FIG. 11;

FIG. 13 is an end view taken in a direction of the arrow XIII in FIG. 12;

DETAILED DESCRIPTION

Figure 1:
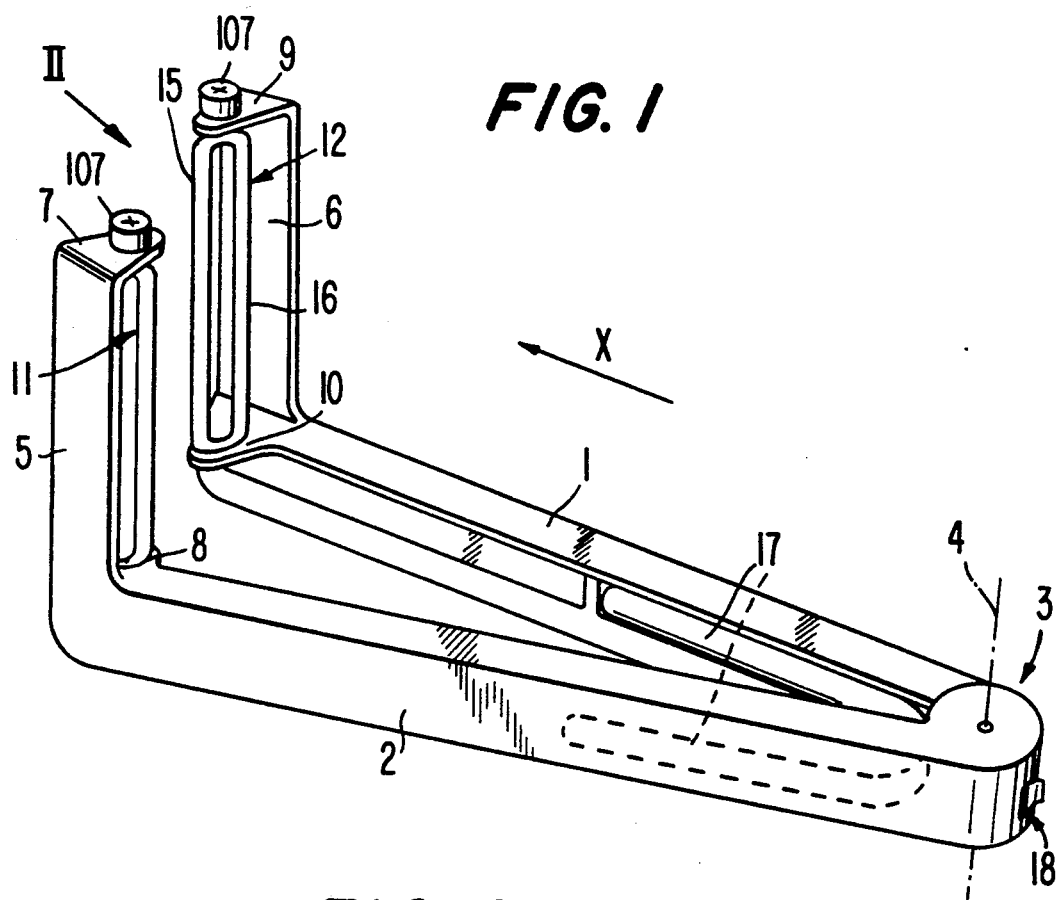
FIG. 1 is a perspective view of a first embodiment of a invention.
Figure 2:
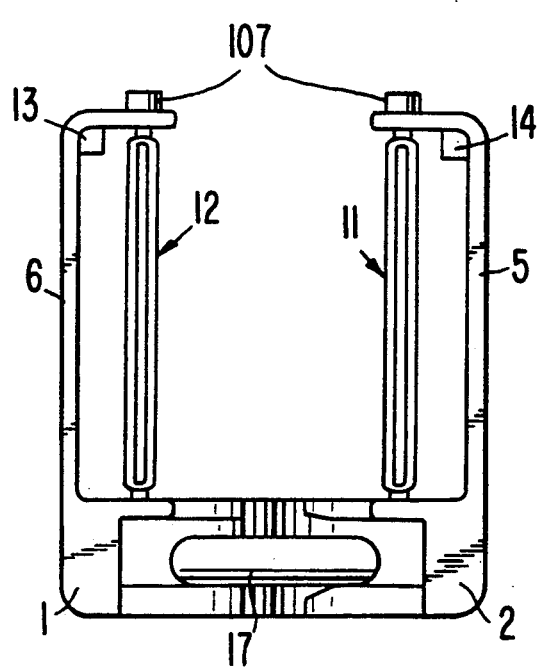
FIG. 2 is an end view taken in the direction of the arrow II in FIG. 1.

Referring now to the drawings wherein like reference numerals are used throughout the various views to designate like parts and, more particularly, to FIGS. 1 and 2, according to these figures, a hand tool in accordance with the present invention includes two hand levers 1, 2 produced, for example, from pressure die castings such as, for example, aluminum pressure die castings, with the hand levers 1, 2 being fashioned as one-armed hand levers and being articulated to each other at one end by way of a hinge generally designated by the reference numeral 3 such that a pivot axis 4 of the hinge 3 is oriented perpendicularly to a longitudinal extension or longitudinal plane of the hand levers 1, 2. Paring knife holders 5, 6 are respectively integrally formed in one piece with the respective hand levers 1, 2 with the knife holders 5, 6 projecting away at a right angle with respect to the longitudinal plane of the hand levers 1, 2. The knife holders 5, 6 respectively include bearing eyes 7, 8, and 9, 10 for supporting conventional low-waste paring knives generally designated by the reference numerals 11, 12. The paring knives 11, 12 are supported so as to be loosely rotatable in the bearing eyes 7, 8 and 9, 10 with a rotatability of the paring knives 11, 12 being limited by stops 13, 14.

Each of the paring knives 11, 12 include, as is conventional, an abutment member 16 on a side thereof facing the hinge 3 and a blade 15 adapted to lie on an outside so that an elongated or rod-shaped vegetable to be peeled may be pulled, during paring strokes, through the pair of paring knives 11, 12 in a direction of the arrow X. By compressing the hand levers 1, 2 grasped by one hand of the user, against the force of an expansion spring 17, the paring knives 11, 12 are brought into engagement with the elongated or rod-shaped vegetable with the cutting contact pressure thereby being determined. Since the two paring knives 11, 12 are oriented such that a longitudinal extension thereof is parallel to the pivot axis 4, the paring knives 11, 12 remain, in all cases, exactly in parallel to each other independently of the expanded position of the hand levers 1, 2 so that the elongated or rod-shaped vegetable is always peeled on exactly diametrically opposed sides.

A conventional hinge lock of the type disclosed, for example, in aforementioned German Patents 1,144,659 and 1,177,086, may be provided in an area of the hinge 3 so as to enable a locking of the two hand levers 1, 2 in a closed position during non-use of the hand tool. Suitable fastening means such as, for example, screws 107 may be used for holding the paring knives 11, 12 so as to enable an easy exchangability of such knives. By changing a mounting position of the paring knives by 180°, the abutment member 16 may be placed in front, if desired, by simply removing the screws 107 thereby providing the user with the option of mounting the paring knives 11, 12 in the most convenient position for the user of the hand tool.

Figure 3:
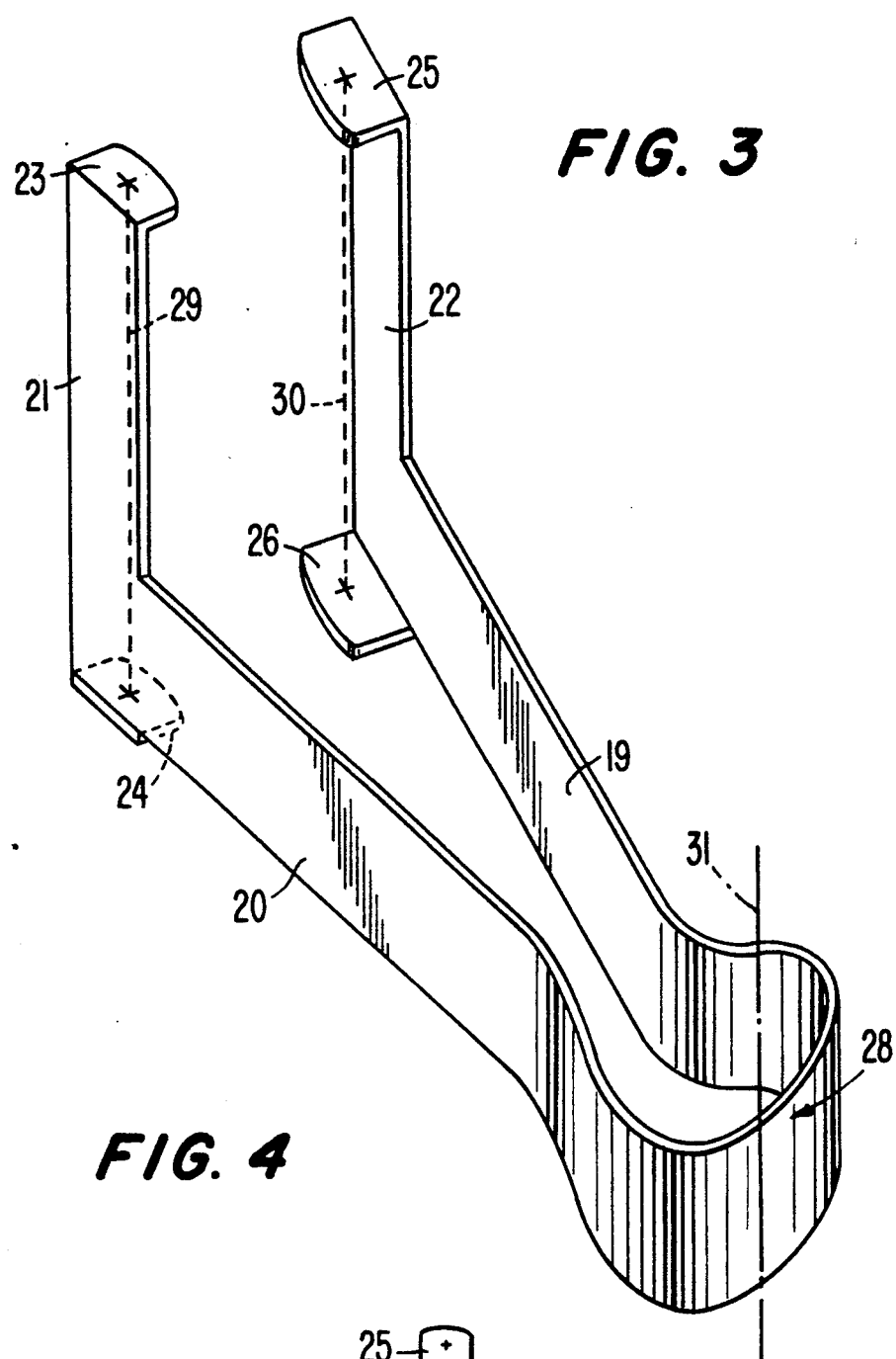
FIG. 3 is a perspective view of a second embodiment of a hand tool constructed in accordance with the present invention and manufactured in one piece of a punched spring steel part.
Figure 4:
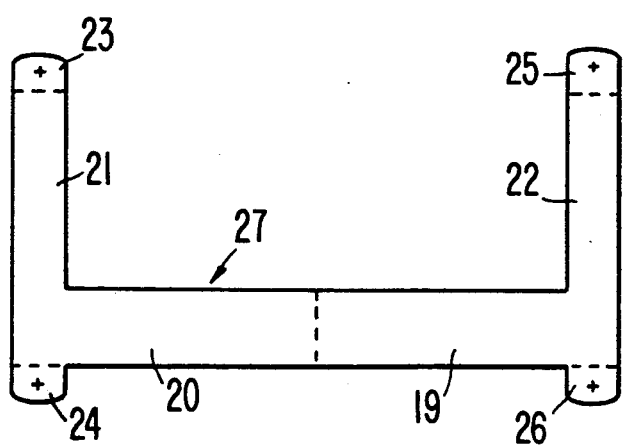
FIG. 4 is a plan view of a punching blank for manufacturing the hand tool of FIG. 3.
Figure 5:
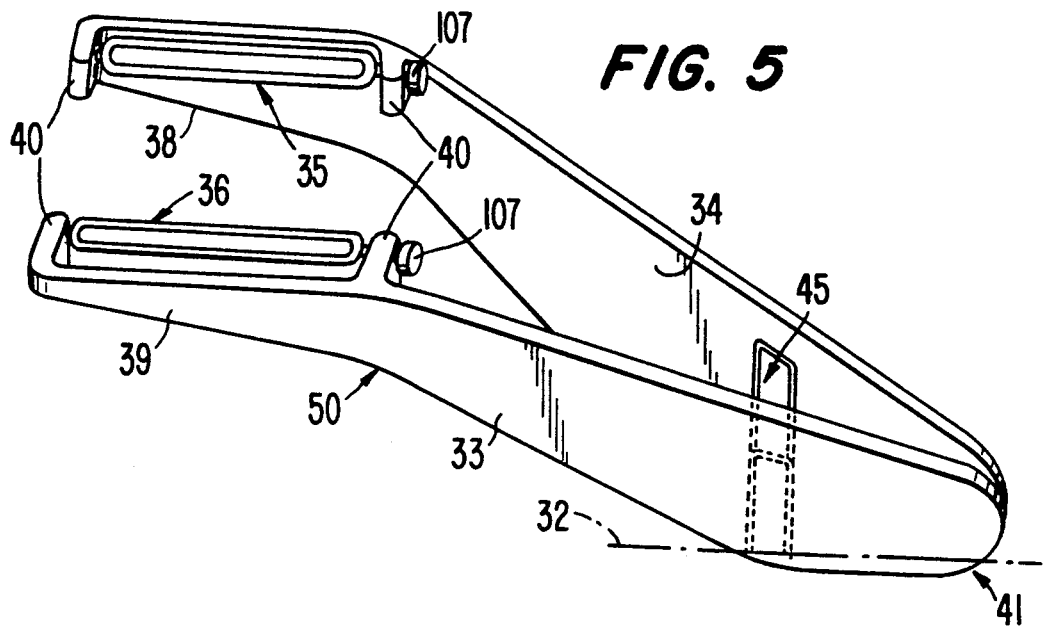
FIG. 5 is a perspective view of yet another embodiment of a hand tool constructed in accordance with the present invention.
Figure 6:
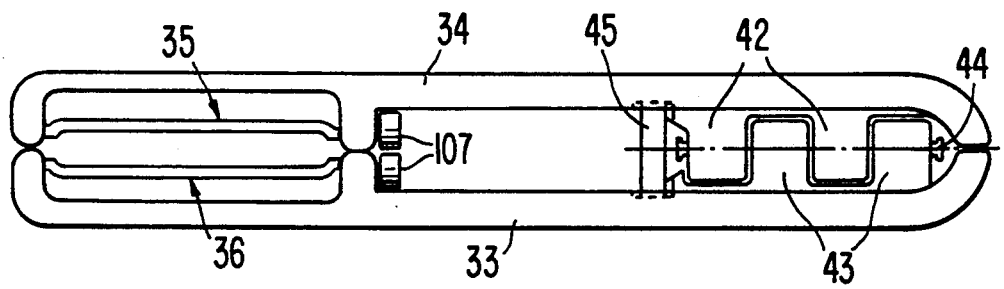
FIG. 6 is a top view of the hand tool of FIG. 5 in a closed condition.

FIGS. 3 and 4 provide an example of a hand tool which functions identically to the hand tool described hereinabove in connection with FIGS. 1 and 2; however, in FIGS. 3 and 4, the hand levers 19, 20, the holders 21, 22 projecting therefrom at a right angle, and the bearing eyes 23, 24, 25, 26 are manufactured integrally in one piece from a punched spring steel part 27. The two hand levers 19, 20 pass over into each other in a region or area of a joint formed by a resilient bow generally designated by the reference numeral 28, with the resilient or spring force, as with the embodiment of FIGS. 1 and 2, being directed toward maintaining the hand tool in a basic position, namely, an open spread-apart hand lever position. As with the handle tool of FIGS. 1 and 3, in the hand tool of FIGS. 3 and 4, the paring knives 29, 30 only schematically illustrated but corresponding to the paring knives 11, 12 are oriented in parallel to the pivot axis 31.

As shown in FIG. 4, the tool holder of FIG. 3 may be obtained by providing a punched blank having a substantially U-configuration and, in order to minimize punching waste, it would also be possible to start with a substantially Z-shaped punched blank wherein the holders 21, 22 are arranged on opposite sides of the bent-shaped strip for the hand levers 19, 20 and, in this case, the holder for the handle levers 19, 20 must be additionally bent over toward the side of the other holder. Consequently, the holder which is to be bent must be dimensioned of a correspondingly greater length in correspondence with a width of the strip for the hand levers 19, 20 and for enabling a formation of the bottom bearing eye 24 or 26.

In the hand tool of FIGS. 5-8, a pivot axis 32 of two hand levers 33, 34 and longitudinal axes of the paring knives generally designated by the reference numerals 35, 36 are inclined by an angle of inclination a (FIG. 6) of about 22° with respect to a longitudinal extension of the hand tool represented by the dot-dash line 37. The hand levers 33, 34 are, in the construction of FIGS. 5-8 also manufactured together with the paring knife holders 38, 39 and bearing eyes 40 by pressure die casting such as, for example, aluminum pressure die casting. The hand levers 33, 34 are articulated or pivoted together by way of a hinge generally designated by the reference numeral 41 formed by pairs of hinge sleeves 42, 42 and 43, 43 provided at the respective hand levers 34, 33 and by a hinge pin 44.

It is also possible to provide a hinge lock (not shown) in the hand tool of FIGS. 5-8 corresponding to the hinge lock 18 described hereinabove in connection with FIGS. 1 and 2. A leaf spring 45 is clamped in place between the two hand levers 33, 34, with the leaf spring 45 being bent into a substantially U-shaped configuration. Spring legs 46, 47 of the leaf spring 45 are oriented or extend perpendicularly to the pivot axis 32 and are accommodated by grooves 48, 49 of the hand levers 34, 33, respectively. In lieu of a leaf spring 45, it is also possible, in accordance with the present invention, to provide an expansion leg spring (not shown) surrounding the hinge pin 44.

Figure 7:
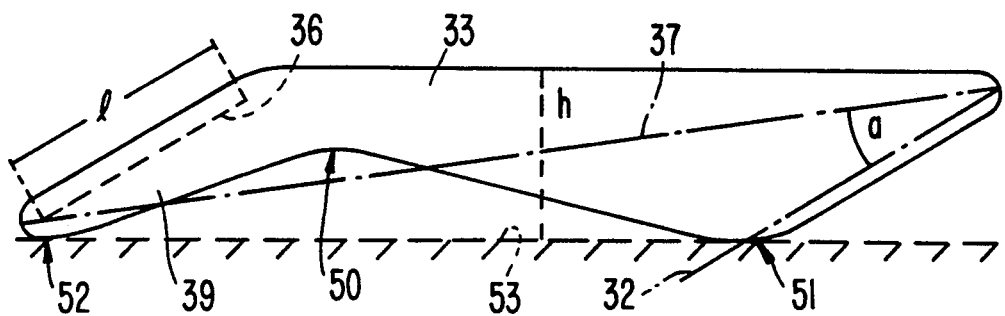
FIG. 7 is a schematic lateral view of the hand tool of FIG. 5.

The hand levers 33, 34, as shown most clearly in FIG. 7 have, in a lateral view, an approximately trapezoidal configuration with a dished or recessed portion generally designated by the reference numeral 50 being provided along one longitudinal side of the trapezoidal cross section. A deepest point of the dished or recessed portion 50 lies closely behind the paring knife holders 38, 39. As can readily be appreciated, the hand levers 33, 34 with the integrally formed holders 38, 39 may also be constructed so as to have a substantially Z-shaped or substantially S-shaped configuration in a lateral view.

When the hand tool of FIGS. 5-8 is in a rest position, with a zone or area generally designated by the reference numeral 51 at the hinge 41 and the forward ends generally designated by the reference numeral 52 of the two holders 38, 39 resting on a surface 53 in, for example, a bottom of a drawer, a height h of the hand tool is markedly shorter than a length l of the paring knives 35, 36 and, in the illustrated embodiment, the height h amounts to only about one-seventh of a total length l, that is, the longitudinal extension 37 of the hand tool. Thus, the hand tool of FIGS. 5-8 is extremely convenient to handle and may be stored in a particularly compact fashion.

Figure 8:
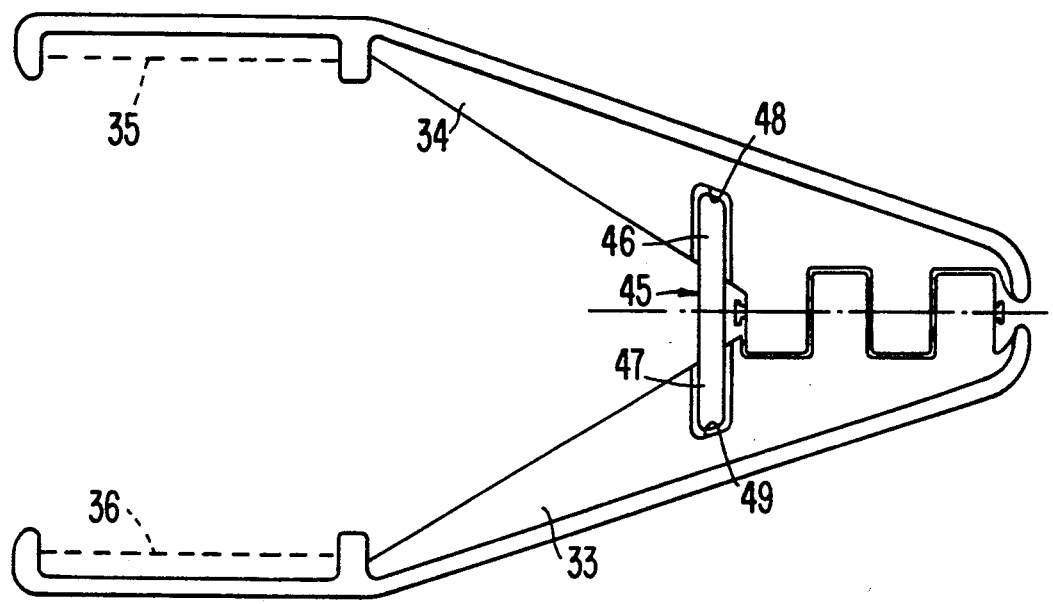
FIG. 8 is a top view of the hand tool of FIG. 5 in an open condition.
Figure 9:
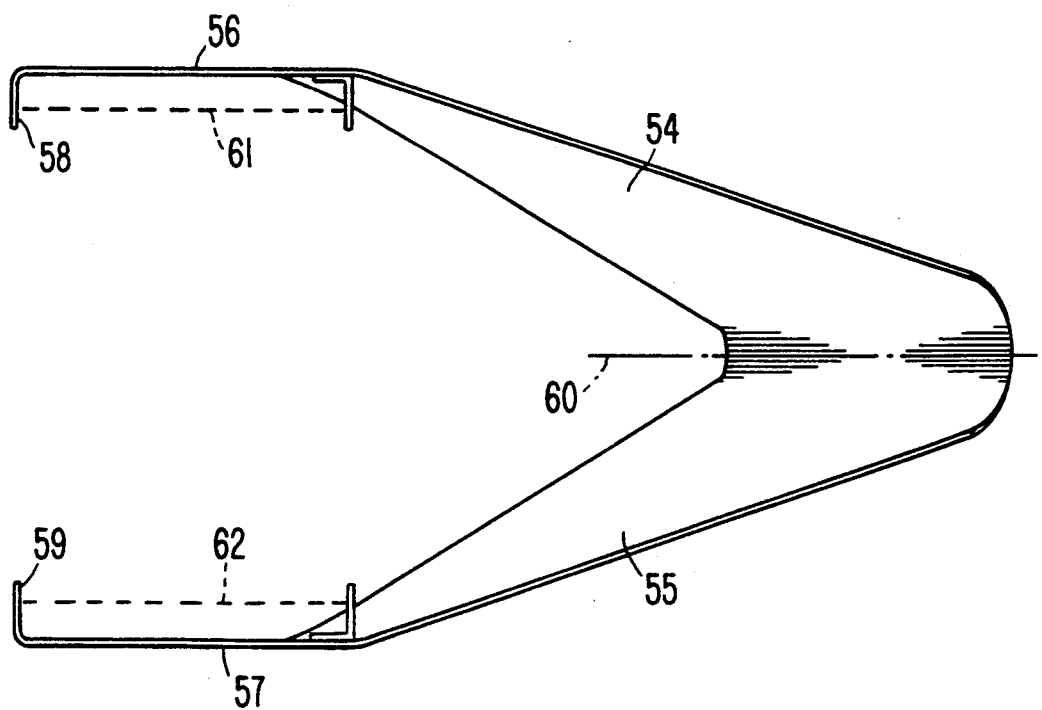
FIG. 9 is a schematic top view of yet another embodiment of the present invention similar to FIGS. 5-8, but with the hand lever being integrally manufactured of a spring steel sheet.

The hand tool of FIG. 9 corresponds in function to the hand tool of FIGS. 5-8; however, in the hand tool of FIG. 9, the hand levers 54, 55 are manufactured with the paring knife holders 56, 57 and the outer bearing eyes 58, 59 of a one-piece punched spring steel part. A bending line or pivot axis 60 of the hand levers 54, 55 is oriented or extends in parallel to a longitudinal extension of the schematically illustrated paring knives 61, 62 and is inclined at an angle a with respect to a longitudinal extension of the hand levers 54, 55 as described hereinabove in connection with FIG. 7, with FIG. 7 also essentially providing a lateral view of the hand tool of FIG. 9.

In all of the embodiments described hereinabove, the cutting contact pressure is manually determined by compression of the hand levers; however, it is also possible in accordance with the present invention for the cutting contact pressure to be automatically provided by a spring force.

In, for example, the embodiments described hereinabove in connection with FIGS. 8 and 9, the relatively broad hand levers 33, 34 or 54, 55 are respectively inclined and arranged in a V-shape with respect to each other not only in a longitudinal extension of the hand levers but also perpendicular to the longitudinal extension, in the basic position so as to provide an especially comfortable hand-hugging grip. During a compressing action, both of the hand levers are more or less closed which permits a precise working with elongated or rod-shaped vegetables having a relatively small to a relatively large diameter. Moreover, the above-described embodiments are readily suitable for peeling with a pull-like cut of the elongated or rod-shaped vegetables as such vegetables are pulled through the cutting nip formed by the paring knives in an oblique rather than perpendicular orientation.

The hand tool of FIG. 10 is manufactured in one piece from a spring steel punching and includes hand levers 63, 64 as well as integrally formed paring knife holders 65, 66 respectively including bearing eyes 67, 68. The hand lever 64 extends with a projection 69 on an outside around the holder 66 of the other hand lever 63 and is oriented or arranged so that the bearing eyes face an outside generally designated by the reference numeral 70 of the holder 66, with the bearing eyes 67 of the holder 66 projecting from the outside 70 in a direction toward the holder 65. Two paring knives 71, 72 are arranged on the outside beside the hand lever 63 and are held in a closed position by an expansion force of a spring bow 73.

To enable an introduction of an elongated or rod-shaped vegetable into the hand tool of FIG. 10, the two hand levers 63, 64 are temporarily compressed, thereby opening the cutting nip and, after an introduction of the vegetables, the pressure of the hand on the hand levers 63, 64 is relieved where upon the paring knives 71, 72 come in contact with the vegetable with a predetermined cutting contact pressure. In the hand tool of FIG. 10, the holders 65, 66 and, consequently, the paring knives 71, 72 project at a right angle from the hand lever 63, 64 and are oriented in parallel to the pivot axis 74.

FIGS. 11-13 illustrate a further embodiment of a hand tool constructed in accordance with the present invention wherein, in contradistinction to the hand tool of FIG. 10, the paring knives 75, 76 and pivot axis 77 of the hand levers 78, 79 are inclined by an angle b of about 35° with respect to a longitudinal extension 80 of the hand levers 78, 79. An extension portion 81 encompasses the hand lever 79 and carries at an upper rim a bent-away support portion 82 for supporting the elongated or rod-shaped vegetable. As can readily be appreciated, it is also possible to provide an expansion spring loaded hinge (not shown) in lieu of the spring bow 83.

In all of the embodiment described hereinabove, one-armed hand levers are provided; however, it is also possible to provide a hand tool including a hinge wherein the hand levers are articulated together in a manner similar to intersecting levers of a conventional pair of pliers.

Figure 14:
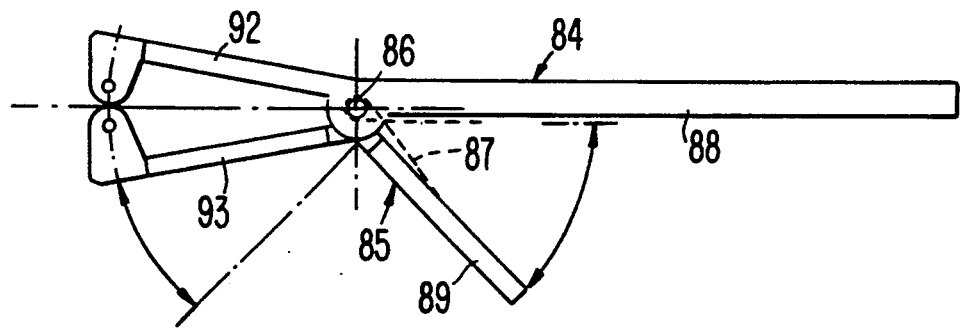
FIG. 14 is a top view of another embodiment of a hand tool constructed in accordance with the present invention.
Figure 15:
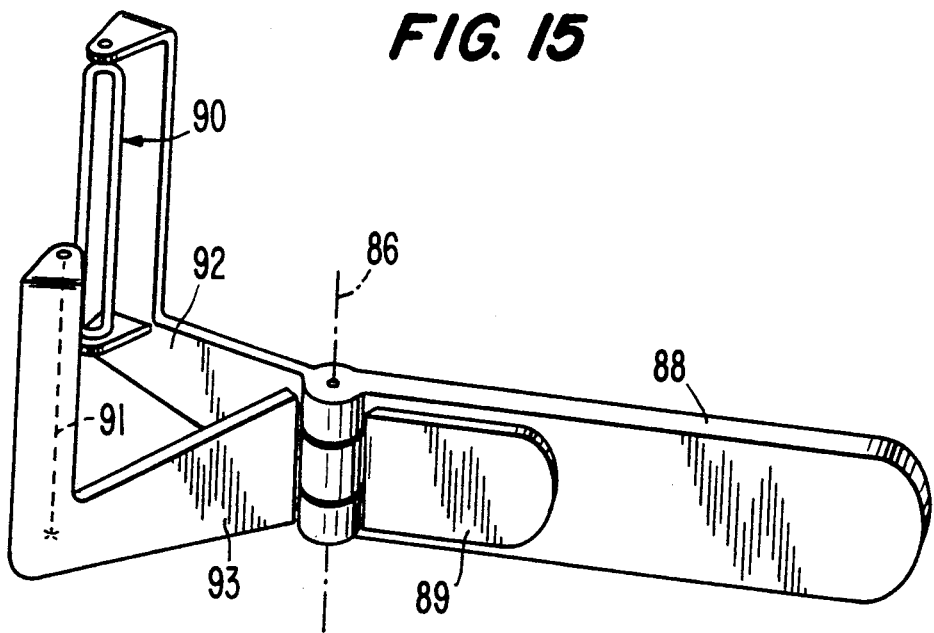
FIG. 15 is a perspective view of the hand tool of FIG. 14.

More particularly, as shown in FIGS. 14 and 15, a hand tool is provided which includes hand levers 84, 85 articulated to each other in a substantially central region thereof similar to clothespin legs so that the hand levers 84, 85 are pivotably movable around a hinge axis 86. For this purpose, for example, the hand lever 84 may be bent at a relatively large degree in an area or zone of the point of articulation, that is, the hinge axis 86. An expansion leaf spring 87 may be provided and encompass or be disposed around the pivot pin forming the hinge axis 86 so that the force legs 88, 89 of the two hand levers 84, 85 are spread apart whereby the working legs 92, 93, carrying the paring knives 90, 91 are compressed into a closed position. The force leg 88 is generally longer than the force leg 89 and is constructed as a tool-holding handle in order to enable introduction of an elongated or rod-shaped vegetable, the force leg 89 is depressed by, for example, the thumb of the user of the hand tool so that the hand tool assumes an open position with the cutting nip being defined between the paring knives 90, 91 as shown most clearly in FIG. 15.

Figure 16:
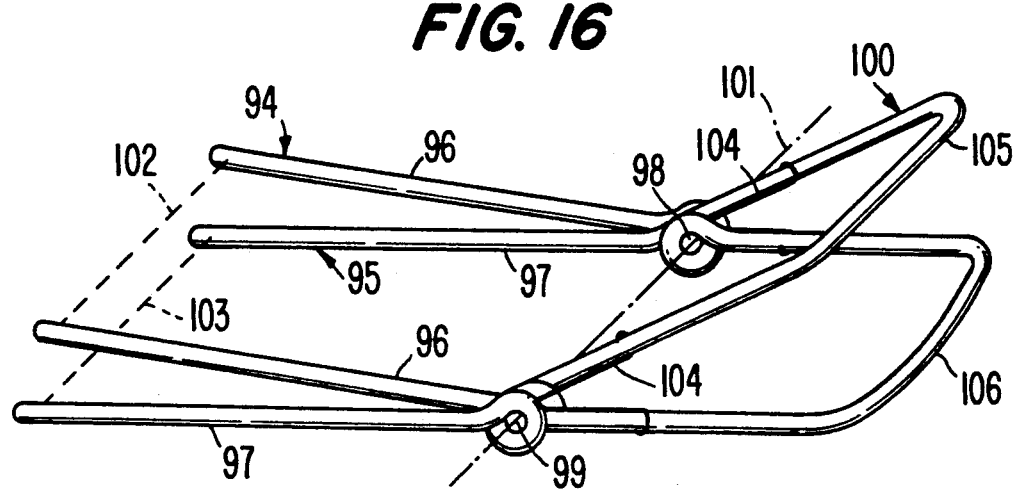
FIG. 16 is a perspective view of a still further embodiment of a hand tool constructed in accordance with the present invention.

It is also possible in accordance with the present invention to provide a hand tool which, as shown in FIG. 16, includes hand levers generally designated by the reference numerals 94, 95, with each hand lever 94, 95 being fashioned of an approximately rectangular bracket of a U-shape, with the brackets being articulated together in an area of two side legs 96, 97 about pivot pins 98, 99.

As shown in FIG. 16, the U-shaped bracket 94, the top bracket in FIG. 16, is angled in a zone of the point of articulation toward the outside or away from the hand lever 95 thereby creating a freely operable force leg generally designated by the reference numeral 100. The U-shaped brackets in each case include wire sections bent so as to create or form bearing eyes around the pivot pins 98, 99. The hand levers 94, 95 carry, at free ends thereof, paring knives 102, 103 extending in parallel to the pivot axis 101. In a basic position, the paring knives 102, 103 are held against each other by expansion leg springs 104. By compressing the transverse legs 105, 106 of the U-shaped brackets, the paring knives 102, 103 are placed in an open position for enabling an introduction of an elongated or rod-shaped vegetable.

Figure 17:
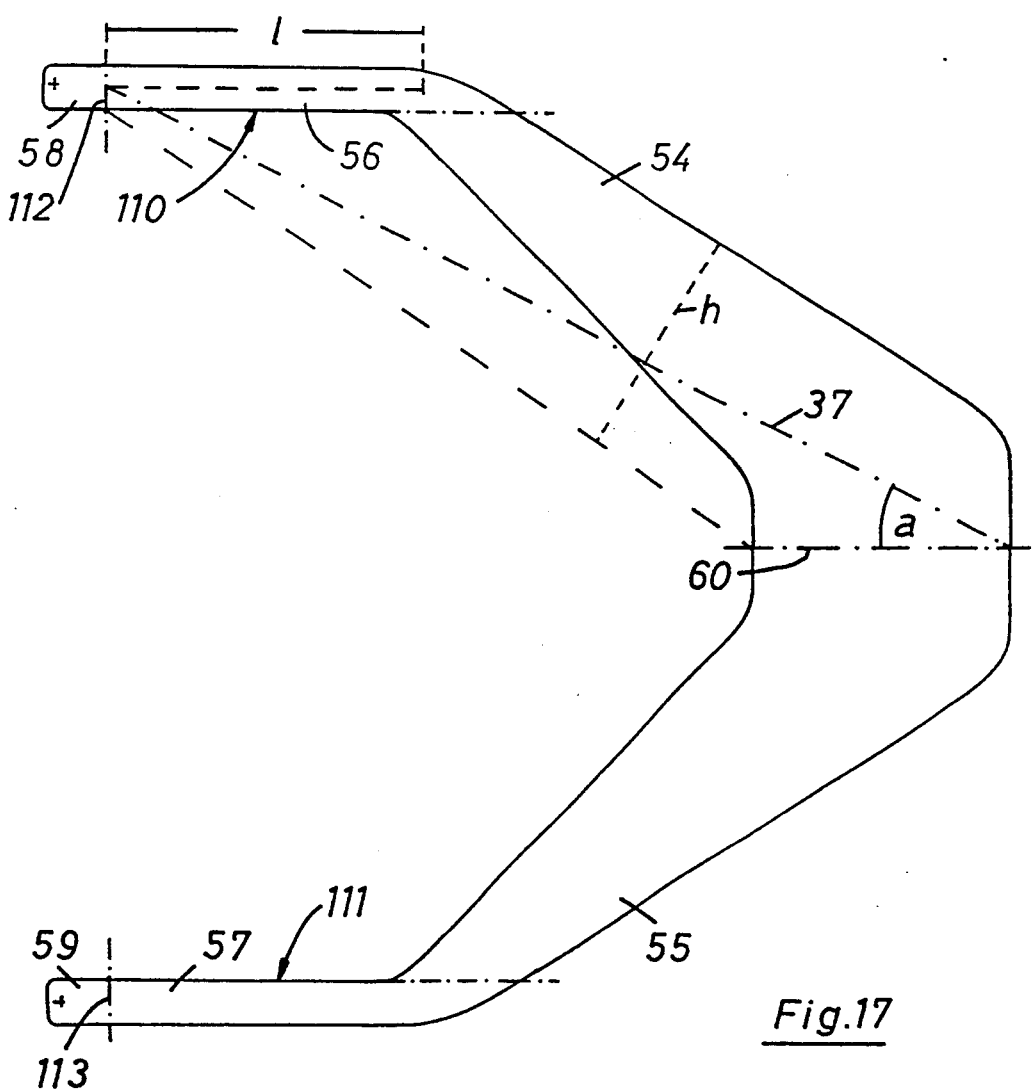
FIG. 17 is a plan view of a punching blank for manufacturing the hand tool of FIG. 9.

As can be readily appreciated, the hand tools described hereinabove are suitable for right handed as well as left handed individuals. As shown in FIG. 17, the tool holder of FIG. 9 may be obtained by providing a punched blank having a substantially V-configuration with parallel stripes at the free ends of the V-configuration, which stripes are sued to form the paring knife holders 56, 57. The punched blank is bent at the bending lines 108, 109, which are parallel to the bending line 60 lying between the hand levers 54, 55. The bending lines 108, 109 are lying in extension of the inner edges 110, 111 of the stripes. To form the outer bearing eyes 58, 59, the free ends of the parallel stripes are bent at the bending lines 112, 113.

While we have shown and described only one embodiment in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A hand tool for peeling elongated vegetables, the hand tool comprising:

a pair of hand levers each having a paring knife forming low waste peelers on free ends of the respective hand levers;

pivot means for pivotally connecting an end of the respective hand levers opposite to the free end of the respective hand levers to each other so as to form one-armed levers adapted to be grasped by one hand of a user;

means for urging said hand levers into a basic position;

spring means for forcing the free ends of the hand levers into an open position, said spring means being compressible by the hand of the user so as to bring the respective paring knives into engagement with the vegetable; and means for mounting the respective paring knives at the respective free ends of said hand levers so that a longitudinal center axis of the respective paring knives extends in parallel to a pivot axis of said pivot means and the paring knives remain in constant parallel alignment independently of a pivotal position of the hand levers, wherein said means for mounting includes holder means formed in one piece with the respective free ends of the hand levers and extending substantially at a right angle with respect to a longitudinally extending vertical plane of the hand levers, wherein the pivot axis and the longitudinal center axis of the paring knives are disposed at an angle of inclination in a range of 15° to 40° with respect to a longitudinally horizontally extending plane of the hand tool, and wherein a total height of the hand tool is less than a length of the respective paring knives.

2. A hand tool for peeling elongated vegetables, the hand tool comprising:

a pair of hand levers;

pivot means for pivotally connecting an end of the respective hand levers to each other so as to form one armed levers grasped by one hand of a user;

means for urging said hand levers into a basic position;

a pair of paring knives forming low waste peelers; and means for mounting the respective paring knives at opposed free ends of said hand levers so that a longitudinal center axis of the respective paring knives extends in parallel to a pivot axis of aid pivot means and the paring knives remain in constant parallel alignment independently of a pivotal position of the hand levers, wherein the pivot axis and the longitudinal axis of the respective paring knives are inclined at an angle of inclination with respect to a longitudinal horizontally extending plane of the hand tool in a range of 15° to 40°, a total height of the hand tool is less than a length of the respective paring knives, and wherein hand levers are recessed in a central area thereof accommodating the hand of the user.

3. A hand tool according to claim 2, wherein a height of the hand tool is between one-third and one-eighth a length of the hand tool.

4. A hand tool according to claim 2, wherein said hand levers and said means for mounting have a flat substantially Z-shape.

5. A hand tool according to claim 2, wherein said means for urging includes a spring means for forcing the free ends of the hand levers into the basic position, said spring means being compressible by the hand of the user so as to bring the respective paring knives into engagement with the vegetable for peeling the same.

6. A hand tool according to claim 2, wherein said means for urging includes an expansion spring means arranged in an area of the pivot axis, and means are provided in an area of the pivot axis for locking the hand levers in a closed position against a spring force of the expansion spring means.

* * * * *